US012776879B2

(12) United States Patent
Hamidi-Rad

(10) Patent No.: US 12,776,879 B2
(45) Date of Patent: Oct. 27, 2026

(54) METHODS FOR IMPROVING THROUGHPUT IN WIRELESS SYSTEMS

(71) Applicant: InterDigital Patent Holdings, Inc., Wilmington, DE (US)

(72) Inventor: Shahab Hamidi-Rad, Sunnyvale, CA (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 258 days.

(21) Appl. No.: 18/781,320

(22) Filed: Jul. 23, 2024

(65) Prior Publication Data

US 2026/0031951 A1 Jan. 29, 2026

(51) Int. Cl.
*H04L 5/00* (2006.01)
*H04L 1/00* (2006.01)
(Continued)

(52) U.S. Cl.
CPC .......... *H04L 5/0051* (2013.01); *H04L 1/0061* (2013.01); *H04L 1/1812* (2013.01); *H04L 5/0044* (2013.01); *H04L 25/0226* (2013.01)

(58) Field of Classification Search
CPC ................. H04L 5/0048; H04L 5/0051; H04L 27/26132; H04L 27/2613; H04L 27/2636;
(Continued)

(56) References Cited

U.S. PATENT DOCUMENTS

| | | | | |
|---|---|---|---|---|
| 11,949,543 B1 * | 4/2024 | Sayed Hassan | .... | H04L 27/2614 |
| 2010/0223522 A1 * | 9/2010 | Duggan | ................ | H04L 1/0021 714/E11.131 |

(Continued)

FOREIGN PATENT DOCUMENTS

| | | | |
|---|---|---|---|
| EP | 3567818 A1 * | 11/2019 | ......... H04L 27/2656 |
| EP | 3567818 B1 * | 6/2023 | ......... H04L 27/2659 |

OTHER PUBLICATIONS

Third Generation Partnership Project, "Technical Specification Group Radio Access Network; NR; Physical channels and modulation (Release 18)," 3GPP TS 38.211 V18.2.0 (Mar. 2024).

(Continued)

*Primary Examiner* — Olumide Ajibade Akonai
(74) *Attorney, Agent, or Firm* — Volpe Koenig

(57) ABSTRACT

In some implementations, a process implemented in a receiver device may include receiving a signal including one or more DMRS resource elements. The process may include synchronizing the received signal in the time domain, demodulating OFDM symbols of the signal, obtaining a first resource grid from the demodulated OFDM symbols, and performing multi-layer channel estimation utilizing the DMRS resource elements and the first resource grid to generate an estimate of a first channel matrix. Further, the process may include equalizing the first resource grid using the first channel matrix to obtain an equalized resource grid for each of a plurality of transmitted layers. In addition, the process may include de-interleaving, de-mapping, demodulation, and descrambling of the equalized resource grid for each of the plurality of transmitted layers to obtain LLR for a plurality of coded blocks, and channel decoding of the LLR to output a plurality of reassembled code-blocks.

19 Claims, 12 Drawing Sheets

(51) Int. Cl.
*H04L 1/1812* (2023.01)
*H04L 25/02* (2006.01)

(58) Field of Classification Search
CPC . H04L 25/0228; H04L 1/1861; H04L 5/0035; H04L 25/0202; H04L 27/2647; H04L 27/2695; H04L 1/0045; H04L 25/0254; H04L 27/2601; H04L 1/0061; H04L 1/1812; H04L 5/0044; H04L 25/0226; H04L 25/0224; H04W 72/0446; H04W 72/23; H04W 72/04; H04W 72/20; H04W 24/02; H04W 72/542; H04W 56/0035; H04B 17/309; H04B 7/0413; H04J 11/0036
See application file for complete search history.

(56) References Cited

U.S. PATENT DOCUMENTS

| | | | | |
|---|---|---|---|---|
| 2016/0337096 | A1* | 11/2016 | Chari | H04L 5/006 |
| 2025/0021412 | A1* | 1/2025 | Kundu | H04W 24/02 |
| 2025/0031067 | A1* | 1/2025 | Demir | H04L 25/0228 |

OTHER PUBLICATIONS

Third Generation Partnership Project, "Technical Specification Group Radio Access Network; Study on channel model for frequencies from 0.5 to 100 GHz (Release 18)," 3GPP TR 38.901 V18.0.0 (Mar. 2024).

* cited by examiner

METHODS FOR IMPROVING THROUGHPUT IN WIRELESS SYSTEMS

BACKGROUND

Wireless communications are prevalent in many aspects of society and play a crucial role in how people live, work, and interact. In addition, wireless communications are the backbone in the Internet of Things (IOT). The evolution of next-generation wireless networks, for example 5G, 6G, and their successors, mark an innovative time in wireless communications distinguished by unparalleled data speeds, ultra-low latency, and extensive connectivity. When wireless signals are transmitted they propagate through the environment to reach the intended receiver. As a wireless signal propagates through the environment, the signal changes due to a number of effects including: loss, noise, interference, Doppler shifts and the like. To recover the signal, the propagation effects need to be removed from the signal. Channel estimation is a crucial aspect of communication systems to ensure reliable data transmission in wireless environments that may be constantly changing. In 5G NR, for example, Demodulation Reference Signals (DMRS) are utilized for channel estimation and equalization at the receiver end.

Given that the DMRS undergoes the same precoding as the user data, for example data in a Physical Downlink Shared Channel (PDSCH) or data in a Physical Uplink Link Shared Channel (PUSCH), the precoding process is not directly discernible to the receiver. Instead, it appears as a component of the overall channel and its use for channel estimation at the receiver includes the effect of both the propagation channel and precoding. The precision of the estimated channel is contingent upon the number of resources allocated for DMRS, and the related communication standards provide significant flexibility in configuring DMRS resources. Allocating more DMRS may provide a better estimate of the channel, however, allocating more resources for DMRS reduces the resources available for transmission of actual user data, which is not an optimal scenario since capacity and throughput may be reduced. Thus, the need exists for a technological solution that improves channel estimation without the need to increase DMRS resources.

SUMMARY

A method and apparatus that improve throughput in wireless systems are described. In one general aspect, a method implemented in a wireless transmit/receive unit (WTRU) may include receiving a signal including one or more Demodulation Reference Signal (DMRS) resource elements, synchronizing the received signal in a time domain and demodulating Orthogonal Frequency Division Multiplexing (OFDM) symbols of the synchronized signal to obtain a first resource grid from the demodulated OFDM symbols, performing a first multi-layer channel estimation utilizing the DMRS resource elements and the first resource grid to generate a first estimate of a first channel matrix, equalizing the first resource grid using the first channel matrix to obtain an equalized resource grid for each of a plurality of transmitted layers, performing de-interleaving, de-mapping, demodulation, and descrambling of the equalized resource grid for each of the plurality of transmitted layers to obtain Log Likelihood Ratios (LLR) for a plurality of coded blocks, and performing channel decoding of the LLR to output a plurality of reassembled code-blocks corresponding to the plurality of coded blocks. The method may also include: determining a number of successfully decoded code-block based on a cyclic redundancy check (CRC) appended to each code-block; transmitting a Hybrid Automatic Repeat Request (HARQ) corresponding to each of the plurality of reassembled code-blocks when the number of successfully decoded code-blocks equals zero; recoding, modulating, and mapping, the successfully decoded code-block(s) onto a plurality of layers to create a second resource grid when the number of successfully decoded code blocks is greater than zero and less than a total number of the plurality of reassembled code-blocks, where the second resource grid includes the DMRS resource elements and all data resource elements corresponding to the successfully decoded code-blocks; and performing a second multi-layer channel estimation on the first resource grid and the second resource grid when the number of successfully decoded code blocks is greater than zero and less than a total number of the plurality of reassembled code-blocks. Other embodiments of this aspect may include corresponding computer systems, apparatus, and computer programs recorded on one or more computer storage devices, each configured to perform the actions of the methods.

Additional aspects may include performing the method until the number of successfully decoded code blocks is equal to the total number of the plurality of reassembled code-blocks or is equal to a previous number of successfully decoded code blocks. The method where the recoding, modulating, and mapping is performed with the same coding, modulating, and mapping used to transmit the received signal. The method where the second resource grid retains all the data resource elements corresponding to the successfully decoded code block or code blocks and the DMRS resource elements, and where data resources elements corresponding to unsuccessfully decoded code-block(s) are set to zero in the second resource grid. The method where the WTRU may include at least two receive antenna elements, and where obtaining the first resource grid includes mapping data resource elements to corresponding time symbols and corresponding sub-carriers for each antenna element of the WTRU. In an aspect, the method where the first channel matrix is a four dimensional (4D) channel matrix with the dimensions: number of time-symbols (L), number of Orthogonal Frequency-Division Multiplexing (OFDM) sub-carriers (K), a number of transmission layers (P) and number of the receive antenna elements (R). The method where the equalized resource grid may include data resource elements mapped to the corresponding time symbols per slot and the corresponding number of sub-carriers for each of a number of transmitted layers. The method where the channel decoding includes rate-recovery, at least one of Low-Densify Parity-Check (LDPC) decoding or Polar decoding, and reassembling the code-blocks to provide a final decoded transport block. Method where performing the multi-layer channel estimation is via a trained Artificial Intelligence (AI) deep-learning model. Implementations of the described techniques may include hardware, a method or process, or a computer tangible medium.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
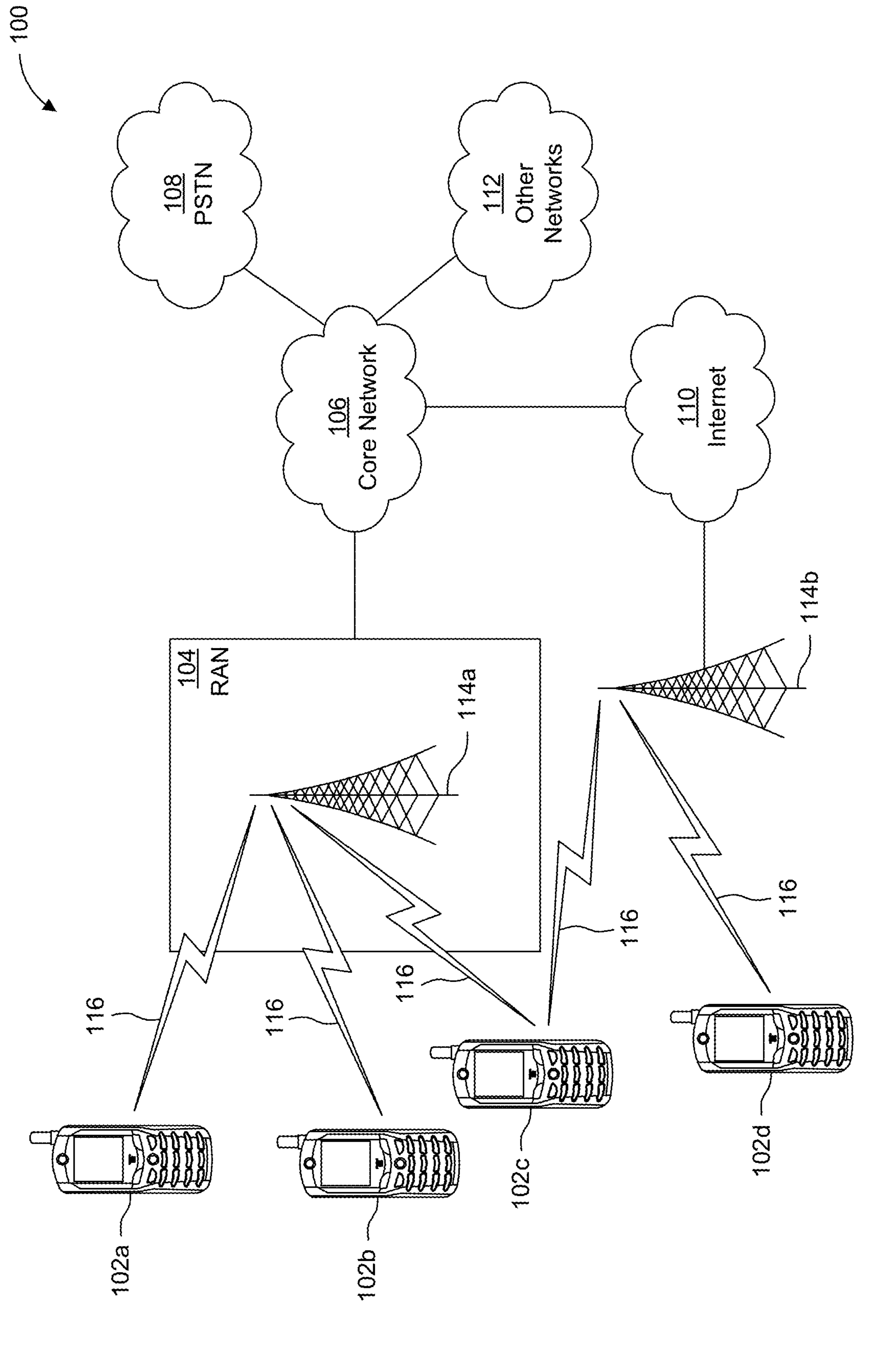
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IOT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
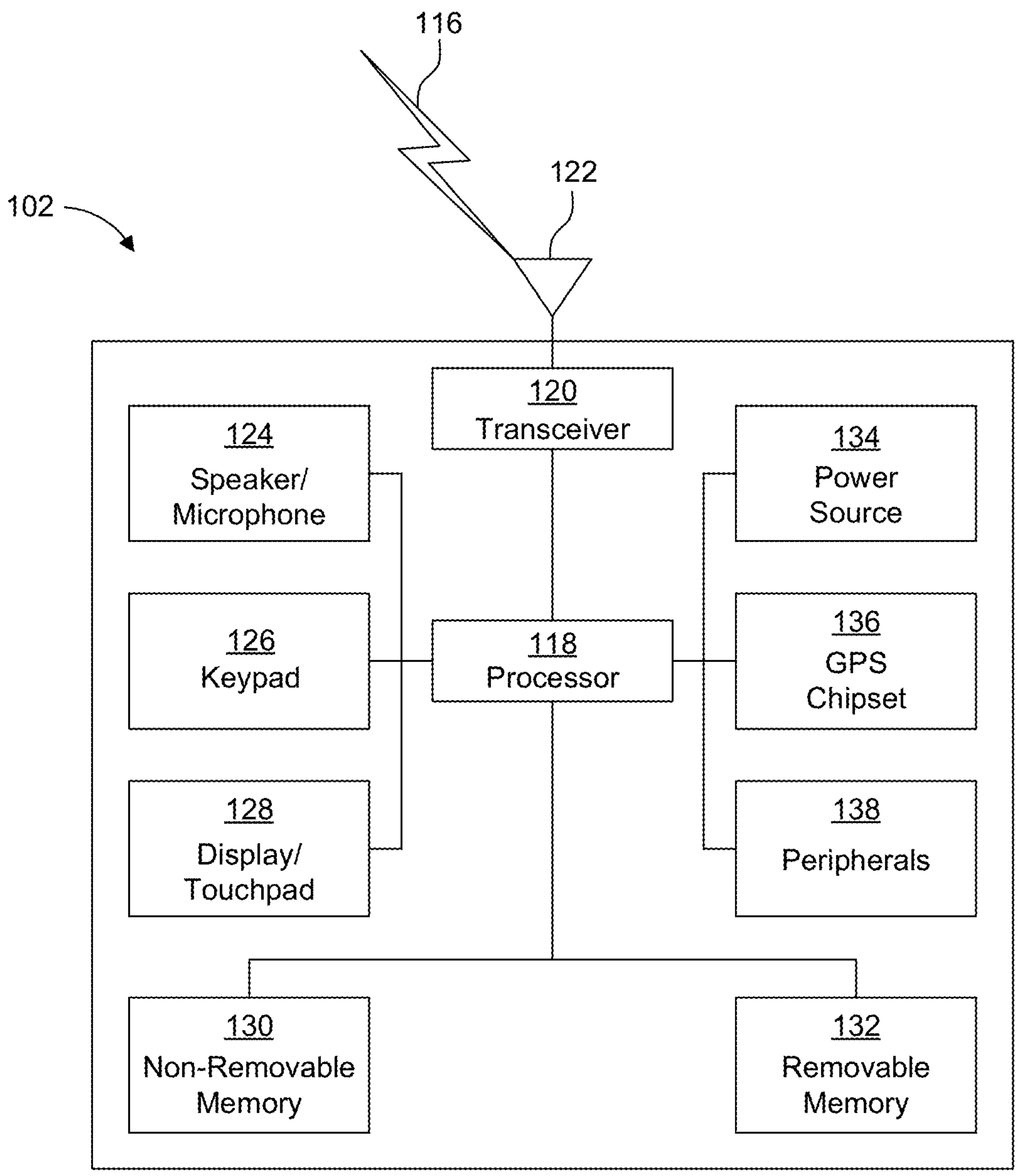
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
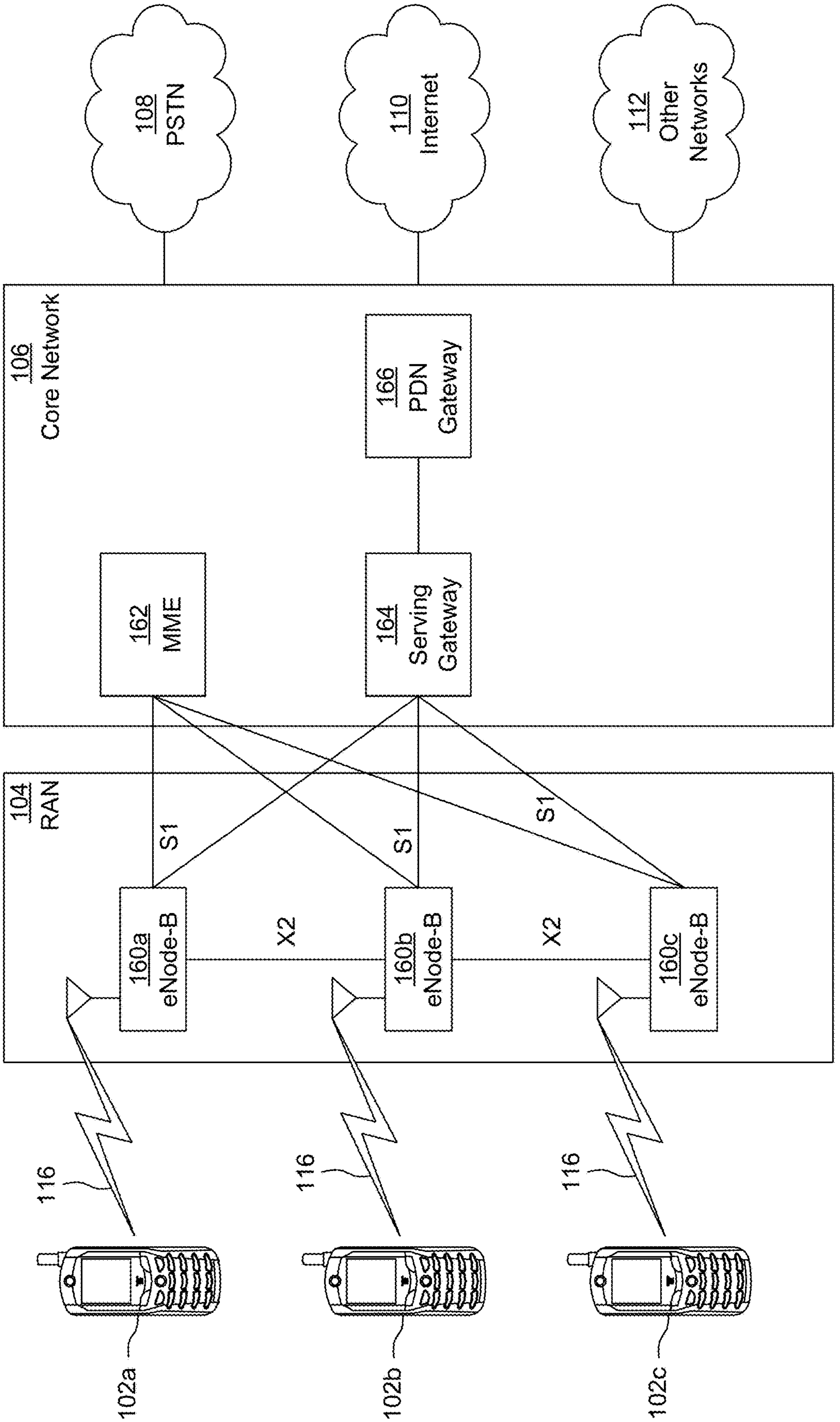
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the ΔP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
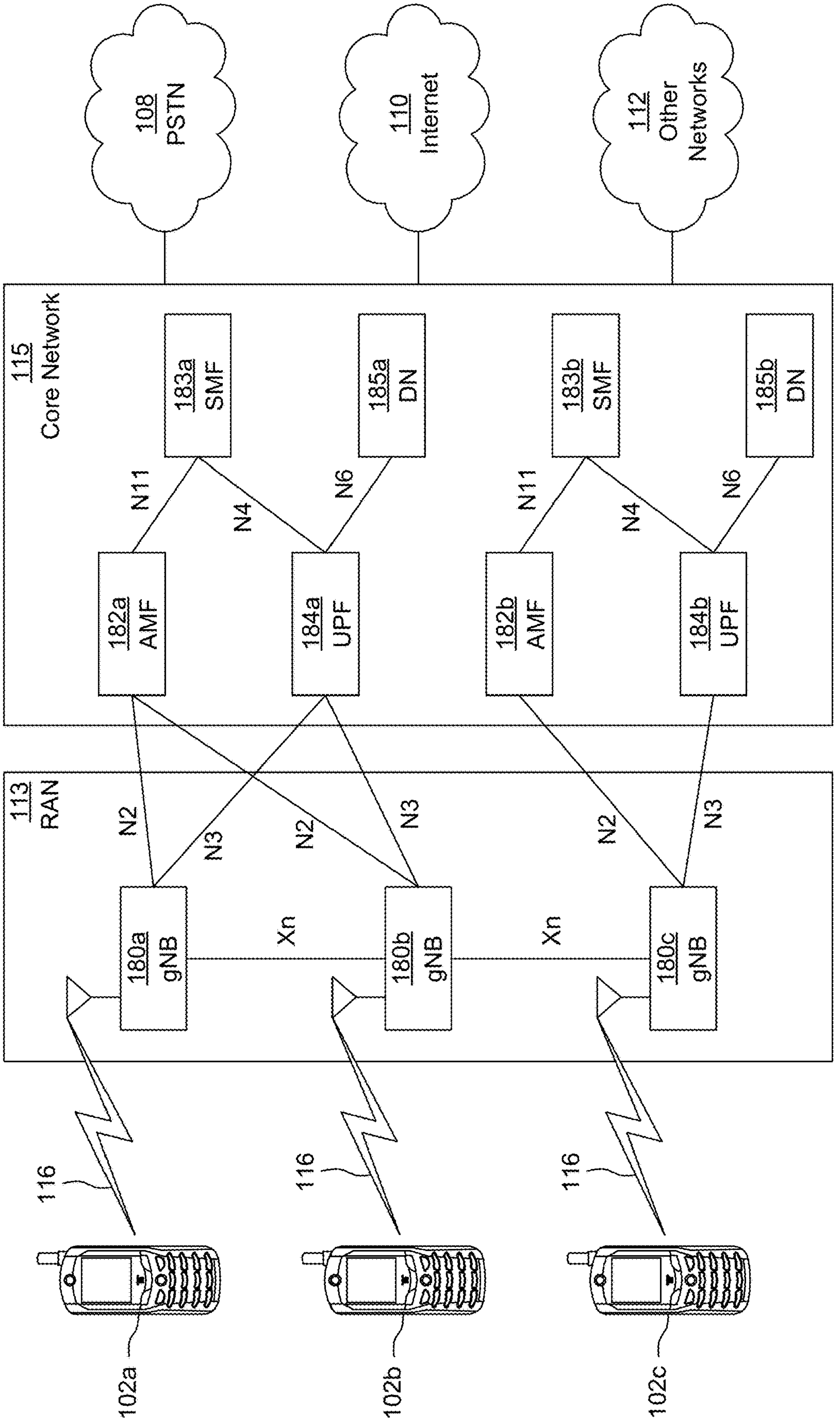
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
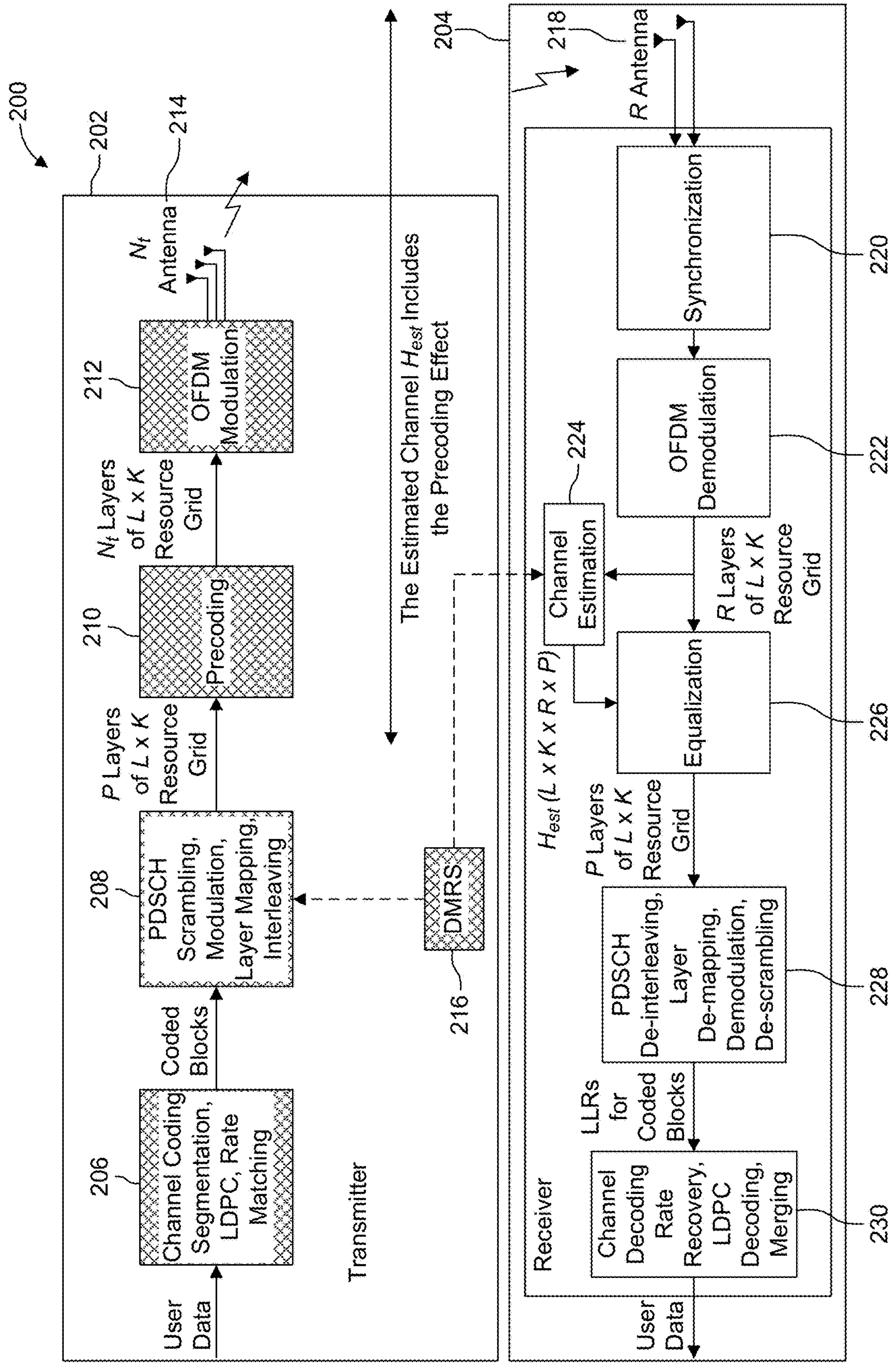
FIG. 2 illustrates a simplified communication pipeline showing the channel estimation process using DMRS.

FIG. 2 illustrates a simplified communication pipeline process showing the channel estimation process using DMRS. Simplified communication pipeline 200 illustrates a transmit pipeline process 202 that includes transmission of Demodulation Reference Signals (DMRS) 216. Transmit pipeline 202 may include processing circuitry configured to perform channel coding 206, scrambling, modulation, layer mapping, interleaving 208, precoding 210, and OFDM modulation 212. Transmit pipeline process 202 may also include a number of transmit antenna elements 214. It should be understood that channel coding 206, scrambling, modulation, layer mapping, interleaving 208, precoding 210, and OFDM modulation 212 may be performed by one or more processors or processing circuits including a transmitter or transceiver. User data may be input to receiver pipeline 202 for processing 206-212, and transmitted with one or more DMRS 216.

In 5G/NR and related standards, DMRS are utilized for channel estimation and equalization at the receiver end. Since they undergo the same precoding as the user data, for example a PDSCH or a PUSCH, the precoding process is not directly discernible to the receiver. Instead, it appears as a component of the overall channel. While the transmit pipeline 202 illustrates a PDSCH, this should not be viewed as limiting as the technological aspects that follow may be applied to other channels such as PDCCH, PUSCH, etc.

Receive pipeline 204 may be configured to receive a transmitted signal and one or more DMRS 216. The received signal may be processed by receive pipeline 204. Receive pipeline 204 may include receive antenna elements 218, processing circuitry configured to perform synchronization 220, OFDM demodulation 222, channel estimation 224, equalization 226, de-interleaving, lay de-mapping, demodulation, descrambling, 228, and channel decoding 230. It should be understood that synchronization 220, OFDM demodulation 222, channel estimation 224, equalization 226, de-interleaving, lay de-mapping, demodulation, descrambling, 228, and channel decoding 230 may be performed by one or more processors or processing circuits including a receiver or transceiver.

Channel estimation 224, as perceived by the receiver, produces a channel matrix that may be regarded as a 4-dimensional complex array with the following dimensions:

Number of time-symbols (L);
Number of OFDM sub-carriers (K);
Number of transmission layers (P); and
Number of receiver antenna (R).

The precision of the estimated channel is contingent upon the number of resources allocated for DMRS, and the related standards provide significant flexibility in configuring these DMRS resources However, allocating more resources to DMRS reduces the resources available for actual user data transmission. Thus, increasing DMRS resources to improve channel estimation may reduce system capacity and increase latency.

The quality of channel estimation could see substantial enhancement by accessing more "known" resource elements at the receiver beyond the DMRS. This could subsequently improve equalization and overall communication throughput.

The following description provides method and apparatuses directed to a technological solution to acquire and use additional "known" resource elements, which may be referred to as pseudo-pilots, by leveraging information already available at the receiver. An improved channel estimation would consequently lead to better equalization, fewer decoding errors, reduced retransmissions, and an overall enhancement in throughput. Also provided is a novel deep learning-based channel estimation method capable of estimating channels based on known non-DMRS resource elements.

The initial challenge involves enhancing the quality of channel estimation by utilizing information already accessible at the receiver, without the need to increase DMRS resources. In the following description, these additional known resource elements may be referred to as pseudo-pilots.

Existing methods of channel estimation are specifically designed to work with DMRS. When there are multiple transmission layers, the signal received on each receiver antenna element for each resource element in the grid represents a combination of signals transmitted on each layer with each layer undergoing different channels.

Existing methods of channel estimation, including both conventional and deep learning-based approaches, are designed to operate with resource elements containing DMRS or channel state information reference signals (CSI-RS). These methods, however, are not capable of estimating the channel based on other known resource elements. This leads a further issue that is addressed, which is the development of a channel estimation method that is compatible with any type of known resource elements, not just DMRS.

For simplicity, the following description is made with reference to a signal received in a downlink. It should be appreciated by those skilled in the art that the same solution may be applied to signals received in an uplink.

The following description is based on a communication pipeline that follows the 3GPP standard for a Physical Downlink Shared Channel (PDSCH) with LDPC channel coding. However, the proposed solution is versatile enough to be applied to other channels, for a PDCCH, a PUSCH, etc., or when other channel coding methods like Polar coding are used. For simulating the communication channel, CDL channel models are employed. These channel models, for example, are stipulated in the 3GPP Technical Report 38.901.

In the 3GPP standard, for example, a transport block is typically divided into several code-blocks, each of which is independently encoded using LDPC or Polar coding. Each code-block includes a CRC for error-checking. At the receiver, a successful CRC check indicates that the user data in that code-block has been reconstructed without errors. By applying encoding, modulation, and resource allocation to this user data, which is similar to the process at the transmitter, it is possible to generate the resource element signals corresponding to the data in a specified code-block.

An example, suppose a transport block is segmented into four code-blocks, and at the receiver, two of these code-blocks pass the CRC check while the other two fail. Normally, retransmission of the information in the failing code-blocks would be necessary, which consumes valuable bandwidth and other resources, while also increasing communication latency.

However, the resource element values corresponding to the bits in the two "good" code-blocks may be determined. This provides new resource elements with known values, in addition to the original DMRS, which can be used as pseudo-pilots to significantly improve channel estimation quality. A better channel estimate leads to improved equalization, and in many cases, the failing code-blocks can then be decoded without CRC errors. Thus, by reusing the information already available at the receiver, the number of retransmissions can often be reduced or eliminated.

As an example, assuming that a WTRU is the receiver, the procedure at the WTRU for each received slot is described. The received DMRS is used to estimate the channel, equalize the received resource grid, demodulate, and decode the information to obtain N decoded code-blocks.

Suppose $N_{good}$ represents the number of code-blocks that pass CRC-check and $N_{fall}$ represents the number of code-blocks that failed the CRC-check, $N_{total}=N_{good}+N_{fall}$.

If $N_{good}=N$ (All passed CRC-check), each code-block is successfully decoded, and nothing further is required.

If $N_{good}=0$ (All failed CRC-check), there are no "good" resource elements that may be used, and retransmission of the code-blocks will be processed according to the HARQ process.

In the case where ($0<N_{good}<N_{total}$), the "good" code-blocks can be used to generate pseudo-pilots.

This process may include: re-encoding, modulating, and allocating resources in a new resource grid using the data in the "good" code-blocks. This new resource grid now contains both DMRS and pseudo-pilots. That is, all known data from transmitted signals.

A Machine Learning (ML)-based channel estimation method, which will be explained later, is used to obtain a better channel estimate by utilizing the grid of known information (DMRS+pseudo-pilots) and the received resource grid. This new channel estimate is used to equalize, demodulate, and decode the received data.

In the case where a new $N_{good}$ is equal to the old $N_{good}$, that is there is no further improvement, the indication is that no further improvement may be made. If there are remaining failed code-blocks, the remaining failed code-blocks would need to be retransmitted. In the case where a new $N_{good}$ is greater than old $N_{good}$ and less than $N_{total}$ the process may proceed with another iteration for further improvement.

Figure 3:
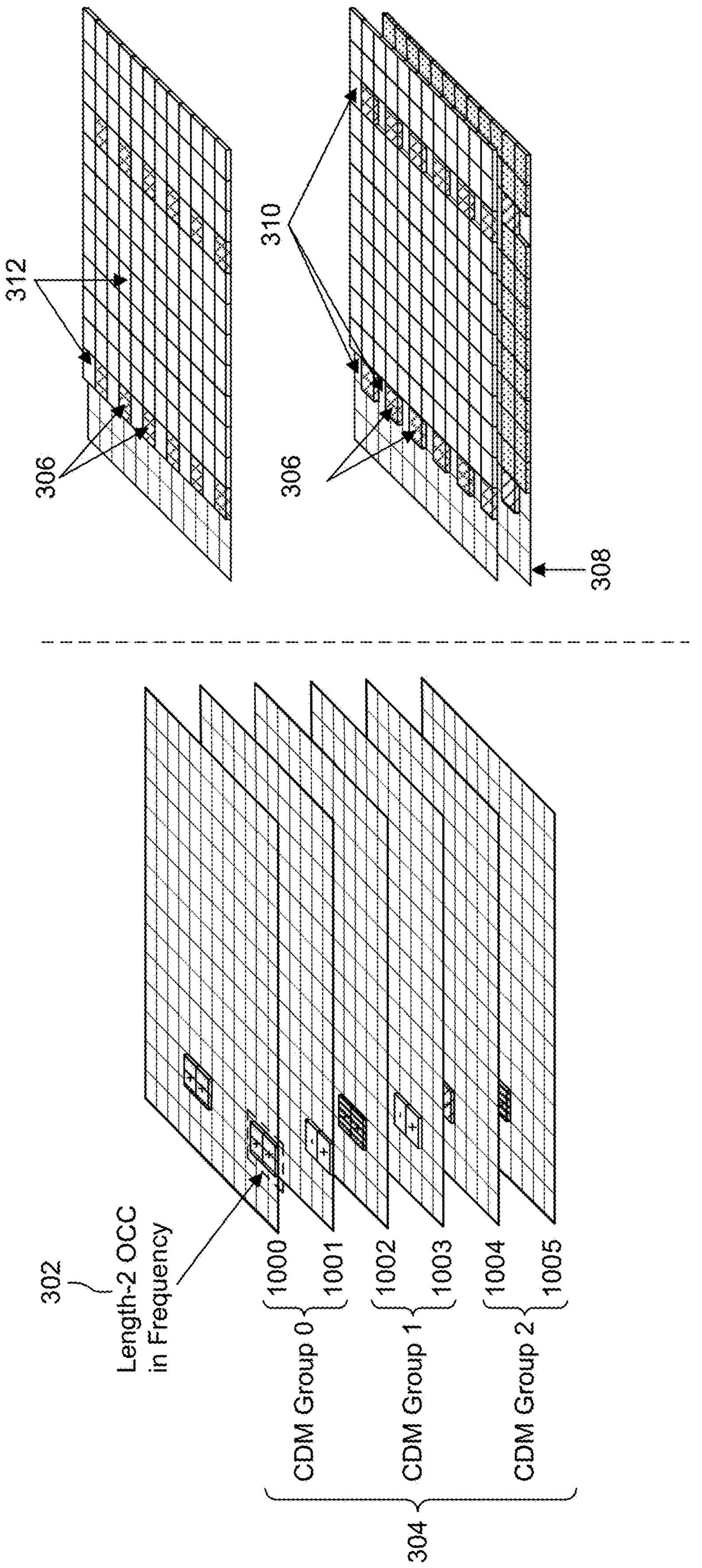
FIG. 3 illustrates a DMRS design that allows channel estimation in a multi-layer/multi-user configuration.

FIG. 3 illustrates a DMRS design that allows channel estimation in a multi-layer/multi-user configuration. From a data transmission perspective, a DMRS resource element, like any other data type, contains complex values. Key differences are that the DMRS is designed to: a) use a pseudo-random sequence known to the receiver and b) employ clever time, frequency, and code division multiplexing to create multiple orthogonal reference signals. As illustrated in FIG. 3, a length 2 orthogonal cover code (OCC) 302 may be used for code division multiplexing (CDM) 304. In an example illustrated in FIG. 3, each CDM group consists of two neighboring subcarriers over which a length 2 OCC 302 may be used to separate two antenna ports sharing the same set of subcarriers. Two pairs of subcarriers 302 may be used in each resource block for one CDM group. Assuming 12 subcarriers in a resource block, up to three CDM groups 304 with two orthogonal references signal each can be created. For example, three CDM groups 304 are illustrated where antenna ports 1000 and 1001 belong to CDM group 0, antenna ports 1002 and 1003 belong to CDM group 1, and antenna ports 1004 and 1005 belong to CDM group 2. These signals enable the receiver to estimate the channel for multi-layer communication. Additionally, as illustrated in FIG. 3, for effective channel estimation a layer's resource elements at the locations of DMRS resources 306 on a different layer 308 must be left empty 310. The unused resource elements may be used for data 312.

Thus, existing channel estimation methods rely solely on DMRS resources, where a set of orthogonal reference signal resource elements work together to facilitate channel estimation in multi-layer configurations. These methods fail if the "known" resource elements contain arbitrary values. Thus, even if all transmitted and received resource element values are known, in a multi-layer MIMO configuration with no noise, the channel matrix still cannot be estimated using current channel estimation techniques.

However, deep-learning-based models can learn the correlations between neighboring resource elements, allowing them to infer the channel more accurately. Experimental results demonstrate that these models can derive channel information from any type of known resource element data, not just DMRS, and even outperform traditional methods when only DMRS is available.

Figure 4:
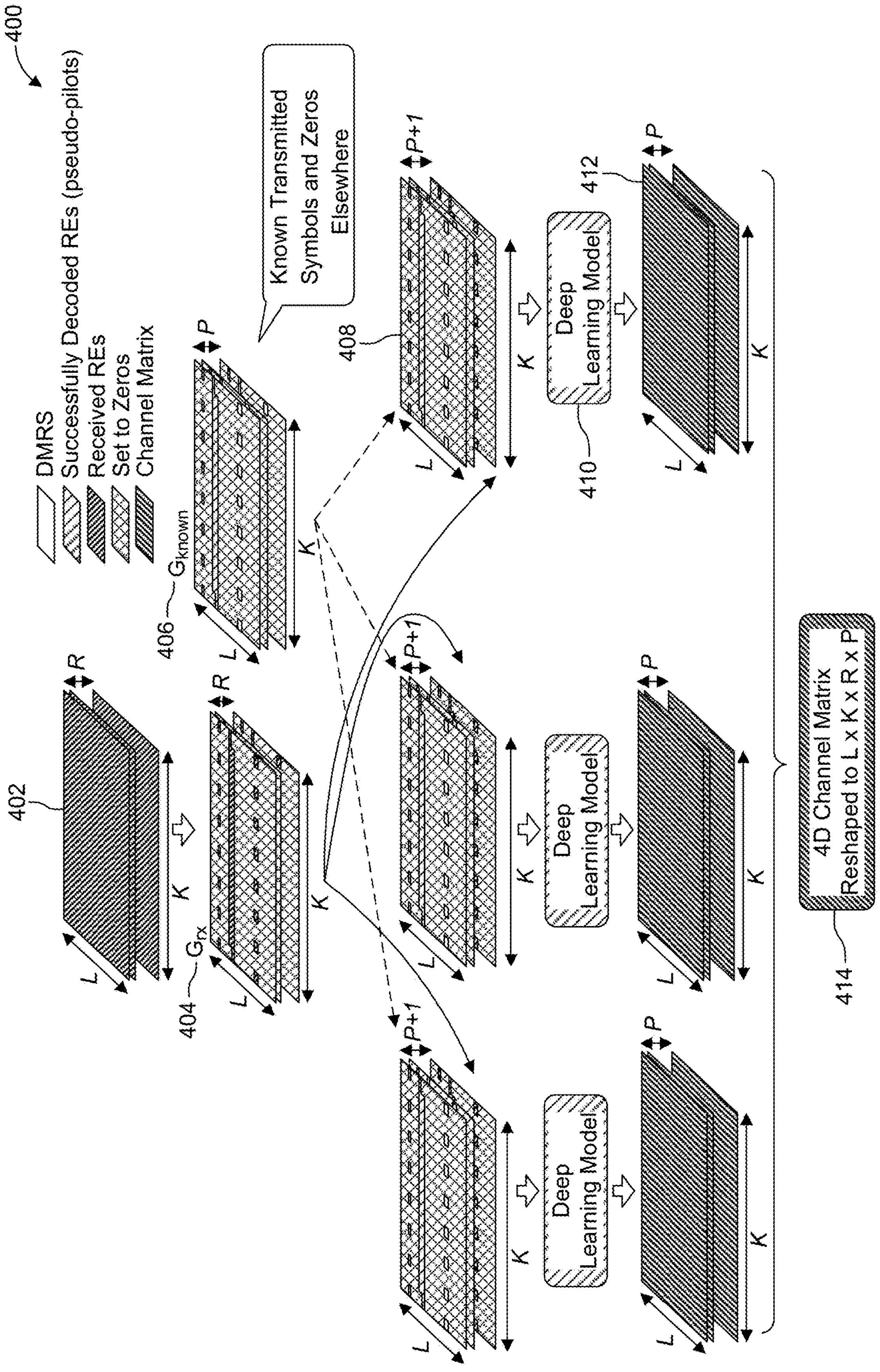
FIG. 4 illustrates a deep-learning model to estimate a channel from the received resource grid and a known transmitted resource.

FIG. 4 illustrates a deep-learning model to estimate a channel from the received resource grid and a known transmitted resource. The known resource grid may contain DMRS and pseudo-pilots.

FIG. 4 illustrates how the received resource grid and the known resource grid containing DMRS and pseudo-pilots (known resource elements) are organized and fed to the deep-learning model. The model's outputs corresponding to each receive antenna are then aggregated to construct the complete 4-dimensional channel matrix.

An example is described where a WTRU is the receiver, and at the WTRU the procedure is implemented for each received slot. It should, however, be understood that the example described may be applied equally where network node or device is the receiver.

Consider a multi-layer MIMO configuration with P layers, R receive antennas, L time symbols per slot (L=14 or 12), and K sub-carriers. Consider an R×L×K received resource grid 402, $G_{rx}$ 404 is a complex 3-dimensional tensor of R×L×K and $G_{known}$ 406 is complex 3-dimensional tensor of P×L×K resource grid containing DMRS information and pseudo-pilot values (known resource elements). Also consider that a deep-learning model is already trained and ready to be used for inference.

In $G_{rx}$ 404 all the resource elements in the grid that are not corresponding to known resource elements in $G_{known}$ 406 are set to zero and all other received values are kept unchanged. $G_{rx}$ is broken down to R matrixes of shape LxK. Each of these L×K matrixes are stacked with the $G_{known}$ tensor. At 408, there are now R tensors each shaped (P+1)×L×K. Note that the first P layers contain the same values in these R tensors.

Each one of the R tensors is fed into to the deep learning model 410. The model outputs tensors of shape P×L×K. After R applications of the model, there are R tensors 412 of shape P×L×K. The outputs are aggregated (and reshaped) to get a single 4-dimensional L×K×R×P channel tensor 414.

Figure 5:
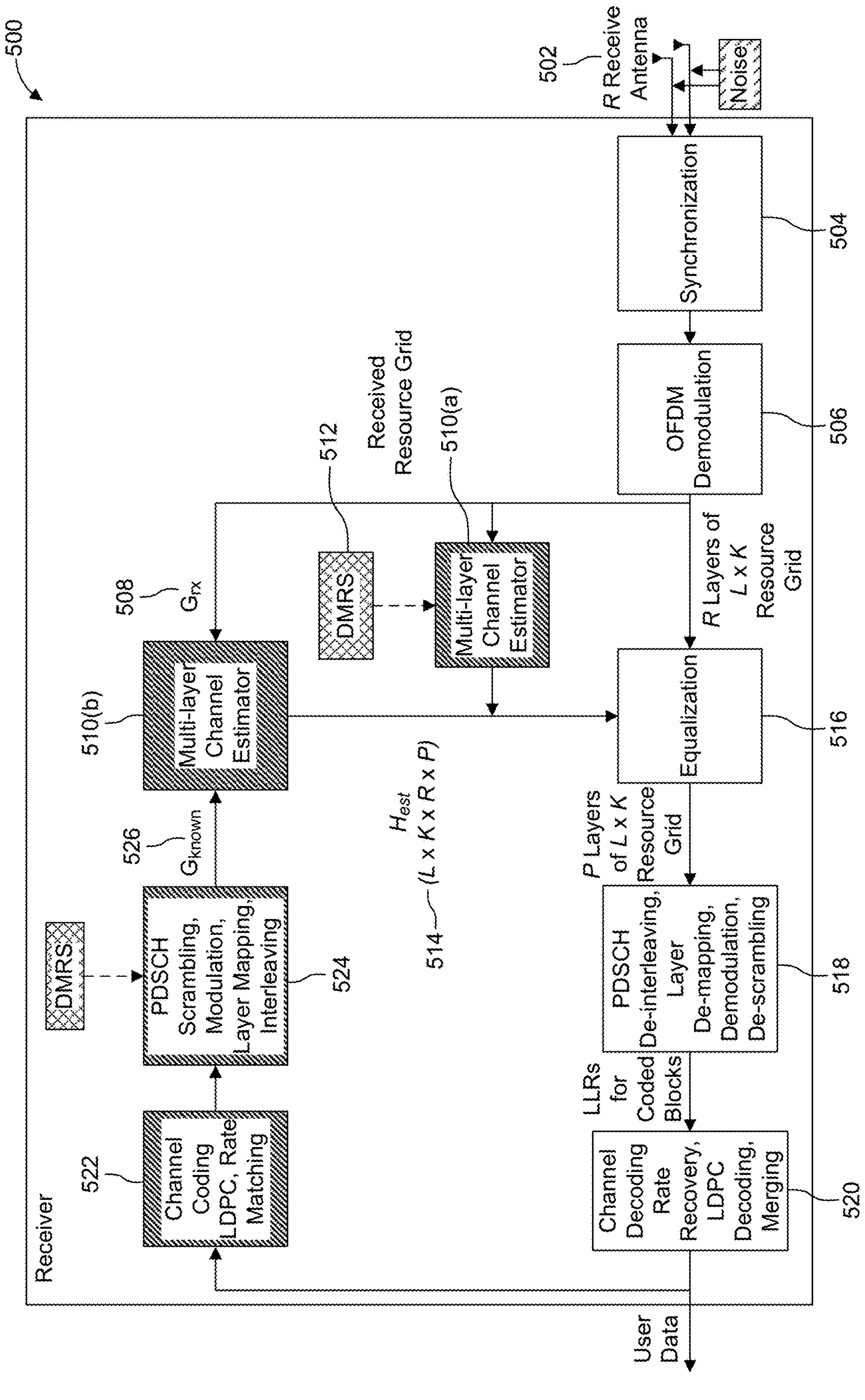
FIG. 5 illustrates an exemplary receiver pipeline employing a multi-layer channel estimator.

FIG. 5 illustrates an exemplary receiver pipeline employing a multi-layer channel estimator. The simplified receiver pipeline reuses the correctly decoded code-blocks to generate pseudo-pilots which are then used for a better channel estimation.

First pass, the first pass through the pipeline closely follows an existing receiver processes. The received time-domain signals are synchronized 504 and OFDM demodulation is then applied to the synchronized signals 506 to obtain the received resource grid $G_{rx}$ 508. The channel estimation 510(*a*) uses the DMRS values 512 together with the received resource grid $G_{rx}$ 508 to make an initial estimation of the channel matrix $H_{est}$ 514.

This preliminary estimate is used by the equalizer 516 to obtain the equalized P×L×K resource grid. After de-interleaving, layer de-mapping, demodulation, and descrambling processes 518, we obtain the Log-Likelihood Ratios (LLR) that are then fed to the channel decoding 520. The channel decoding involves rate-recovery, LDPC decoding, and reassembling the code-blocks to provide the final decoded transport block.

After the initial pass, N decoded code-blocks are output from channel decoding 520. Each of these code-blocks carries a CRC that can be utilized to verify the accuracy of its decoding. The number of code-blocks with a correctly verified CRC are denoted as $N_{good}$, and those with a failed CRC are denoted as $N_{fall}$. Therefore, the total number of code-blocks, N, is the sum of $N_{good}$ and $N_{fall}$. There are several scenarios regarding the value of $N_{good}$ in comparison with N to consider.

In the case where $N_{good}$=N, all the code-blocks are decoded correctly and the entire decoding process was successful. There is no room for improvement in this case and no further actions is required.

In the case where $N_{good}$=0, all code-blocks failed the CRC-check. Since no reliable information is available in the decoded data, the channel estimation in this case cannot be improved. All the code-blocks need to be retransmitted in this case.

In the case where $0<N_{good}<N$, some of the code-blocks passed the CRC-check and some failed. The information in the "good" code-blocks can be used to generate pseudo-pilots for better channel estimation to rescue the code-blocks with failed CRC.

The description that follows explains the procedures used in the case where $0<N_{good}<N$.

Pseudo-pilots are created to for channel estimation. Utilizing the same methods applied to code-blocks at the transmitter, the code-blocks are encoded 522, modulated, and mapped 524 onto layers to create a resource grid. This grid contains all the resource elements corresponding to each code block and also includes the already known DMRS 512. From this grid, all the resource elements corresponding to the "good" code-blocks are retained, while the resource elements associated with the "failed" code-blocks are set to zero. This results in a resource grid, denoted as $G_{known}$, 526 containing all known information. Essentially, the content of this resource grid, at non-zero locations, is an exact match with the grid that was originally transmitted.

The newly created $G_{known}$ 526 and the original received resource grid Gx 508 are input into channel estimator model 510(*b*) to generate an improved channel estimate. Note that channel estimators 510(*a*) and 510(*b*) are shown for illustrated purpose. Channel estimators 510(*a*) and 510(*b*) may employ the same channel estimator models, and single channel estimator may be employed. That is, $G_{known}$ 526 and $G_{rx}$ 508 may be input to the same channel estimator, for example 510 (a), where DMRS 512 and $G_{rx}$ 508 are input for the initial channel estimation.

The remaining pipeline processes are executed using this new channel estimate. Experimental results indicate that utilizing this new channel estimate generally enhances the count of correctly decoded code-blocks, $N_{good}$, reducing the number of retransmissions significantly, which results in a substantial increase in the overall throughput. The experimental results are in a subsequent section.

The illustration of simplified receive pipeline 500 is for ease of understanding. Receive pipeline 500 should not be viewed as limiting in any aspect. The function of each block illustrated in FIG. 5 may performed by a one of more processors or processing circuitry in a receiver or a transceiver. The receiver or transceiver may include multiple receive antenna elements 502.

Each time code-blocks are decoded, a determination is made whether to continue or halt the process. If the count of correctly decoded code-blocks remains unchanged from the previous iteration, this implies that the new channel estimate did not result in an improvement in the decoding process. Therefore, the process would cease at this point. Any remaining failed code-blocks would then need to be retransmitted using the HARQ process. If the number of correctly decoded code-blocks improves the process may continue until no further improvement is detected.

As explained, even when all transmitted resource element values and all received values are known, in a multi-layer MIMO configuration, it is not possible to estimate the channel matrix using existing channel estimation methods, even in a noise-free environment. The channel estimator described may be a deep-learning channel estimator.

Existing multi-layer MIMO channel estimation methods may only function with specific combinations of meticulously designed orthogonal DMRS values. Expanding these current channel estimation methods to a more general case, where the "known" resource elements can take any value, results in solutions that are highly complex and computationally demanding.

This implies that the existing methods of channel estimation are unable to utilize the pseudo-pilots (known resource elements) that are acquired through the accurate decoding of code-blocks.

Another aspect of this disclosure encompasses the development of a distinct method for reconfiguring the input data, $G_{known}$ and $G_{rx}$, in a manner suitable for a deep-learning model. This data reconfiguration allows for the creation of a substantial dataset comprised of received resource grids and known resource grids. This dataset may be used to train the channel estimator via an offline supervised learning process. Once trained, this model may be integrated into the receiver pipeline, as demonstrated in FIG. 5. Experimental results show that by implementing this approach, the trained model outperforms traditional methods when only DMRS resource elements are available in $G_{known}$ and approaches the perfect channel estimate (The ground truth) when pseudo-pilot resources derived from "good" code-blocks are included in $G_{known}$.

Figure 6:
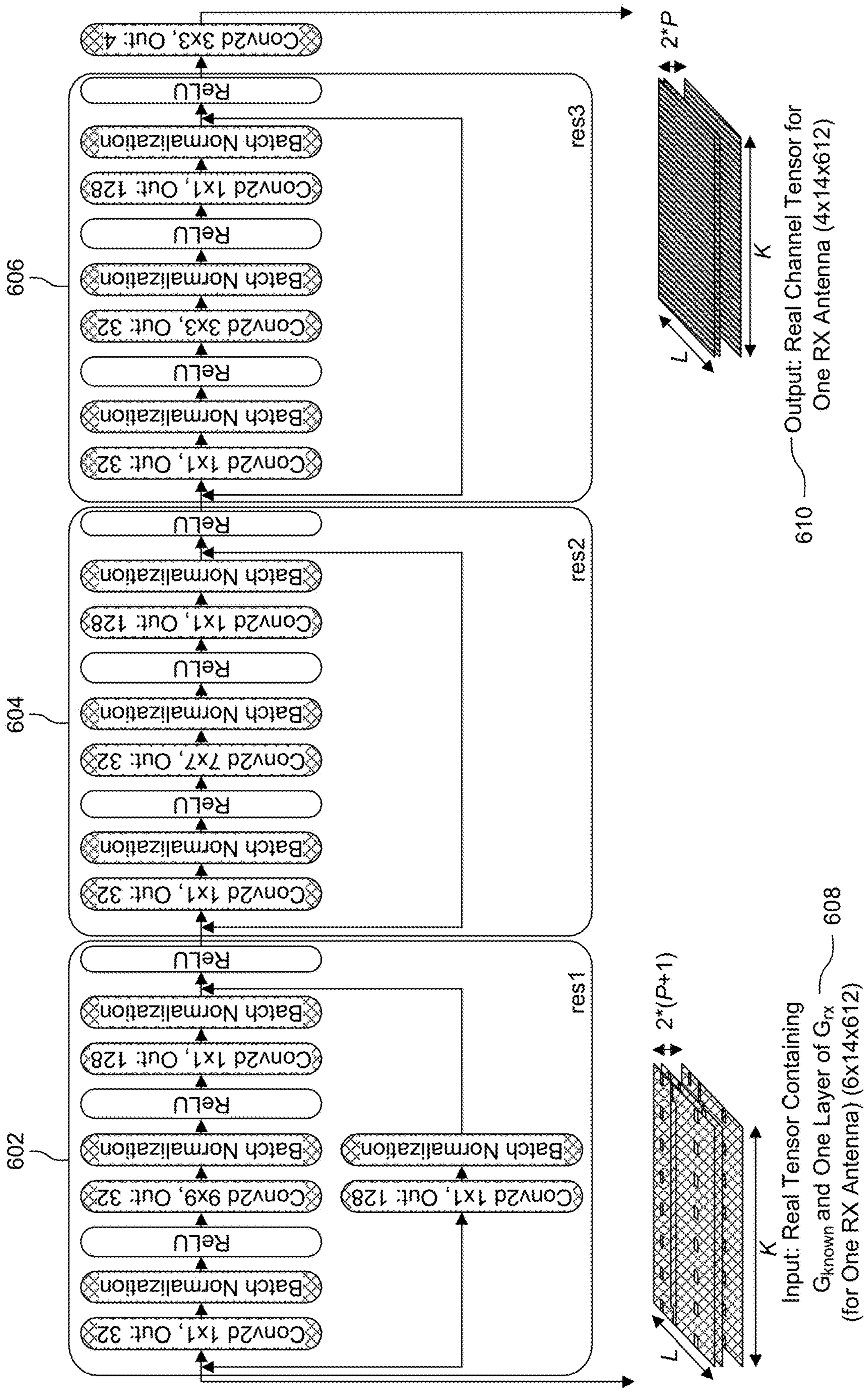
FIG. 6 illustrates a Channel Estimation Neural Network structure based on Residual Network architecture.

New datasets may be created and used in the channel estimator. FIG. 6 illustrates a Channel Estimation Neural Network structure based on Residual Network. The example illustrated in FIG. 6 assumes 4 receive antenna (R=4) and two layers of communication (P=2). This example assumes 612 sub-carriers (K=612), and 14 symbols per slot (L=14).

To generate the training dataset, it is important to simulate all potential situations that could arise during the inference stage. This is achieved by creating a communication pipeline and feeding it with random transport blocks. This results in a set of received resource grids, $G_{rx}$, at the output of OFDM demodulation in the receiver. For each $G_{rx}$, a known resource grid $G_{known}$ is created by randomly selecting one of the scenarios with 0 to N−1 "good" code-blocks ($N_{good}$ E {0, . . . , N−1}, 0 means only DMRS is available). This process yields a pair ($G_{known}$ and $G_{rx}$), which are then restructured into R tensors of dimensions (P+1)×L×K, as illustrated in FIG. 4, where R is the number of receiver antennas. This implies that for each slot communicated through the simulation pipeline, R dataset samples are obtained.

The ground truth channels are obtained from the simulation pipeline, with a variety of CDL channel models being utilized for all the experiments. The channel tensors of dimensions L×K×R×P are divided into R tensors. Each of these tensors is then reshaped/transposed into P×L×K tensors, which are used as labels for the R dataset samples created.

Using different random seeds, training, validation, and test dataset samples are created at different signal to noise ratios, and using different CDL channel profiles (A, B, C, D, and E). An example of the deep-learning model structure is described.

To obtain the experimental results explained in a subsequent section, a residual convolutional neural network structure is used for the channel estimation model with 3 back-to-back residual blocks as illustrated in FIGS. 6 (602, 604, and 606). The input to the model is created by using the known grid $G_{known}$ and stacking it with one layer of the received grid $G_{rx}$. For example, assuming 4 receive antenna (R=4), each pair of $G_{known}$ and $G_{rx}$ makes 4 data samples. Using 2 layers of communication (P=2), K=612 subcarriers, and L=14 symbols per slot, the shape of complex valued sample would be (P+1)×L×K=3×14×612. To feed this sample to a neural network requires a conversion to a real-valued tensor. This doubles the depth of tensor, since real-value tensor includes real and imaginary parts of the complex value, resulting in a real tensor of shape 6×14×612 used as input 608 to the model.

The model outputs real tensors 610 of shape 4×14×612 which can be converted to complex tensors of shape 2×14×612 where one of these tensors per receive antenna is output. After aggregating these tensors and reshaping the results we obtain the final channel matrix of shape L×K×R× P=14×612×4×2 (see 414 of FIG. 4).

Several experimental trials were performed to illustrate the efficacy of the described solutions in comparison to currently available techniques. The outcomes demonstrate the enhancement in end-to-end throughput of a wireless communication system achieved by employing the process elucidated in this disclosure. All the experimental trials were conducted in fully 3GPP compliant simulations. Table 1 provides the details of the configuration for the emulated communication pipeline.

TABLE 1

Simulation Configuration

| Parameter | Value |
|---|---|
| **Carrier/Bandwidth Part** | |
| Number of Subcarriers | 612 (51 resource blocks) |
| Subcarrier Spacing | 30 KHz |
| Cyclic Prefix | Normal |
| Symbols per slot | 14 |
| FFT Size | 1024 |
| **PDSCH** | |
| Number of transmission layers | 2 |
| Modulation | 16 QAM |
| Mapping Type | A |
| **DMRS** | |
| DMRS Config Type | 2 |
| DMRS additional positions | 1 (DMRS REs are on symbols 2 and 11) |
| **Channel Coding** | |
| Code Rate | 490/1024 |
| LDPC Base Graph | 1 |
| **Channel Model** | |
| Number of Transmitter Antenna (Nt) | 16 (Panel of 2 × 4 elements with polarization) |
| Number of Receiver Antenna (R) | 4 (Panel of 1 × 2 elements with polarization) |
| Delay Spread | 300 ns |
| Doppler Shift | 5 Hz |
| Carrier Frequency | 4 GHz |
| Filter Delay | 7 samples |
| CDL Profiles | A, B, C, D, and E |
| SNR values | 0, 5, 10, 15, 20, 25 |

Figure 7:
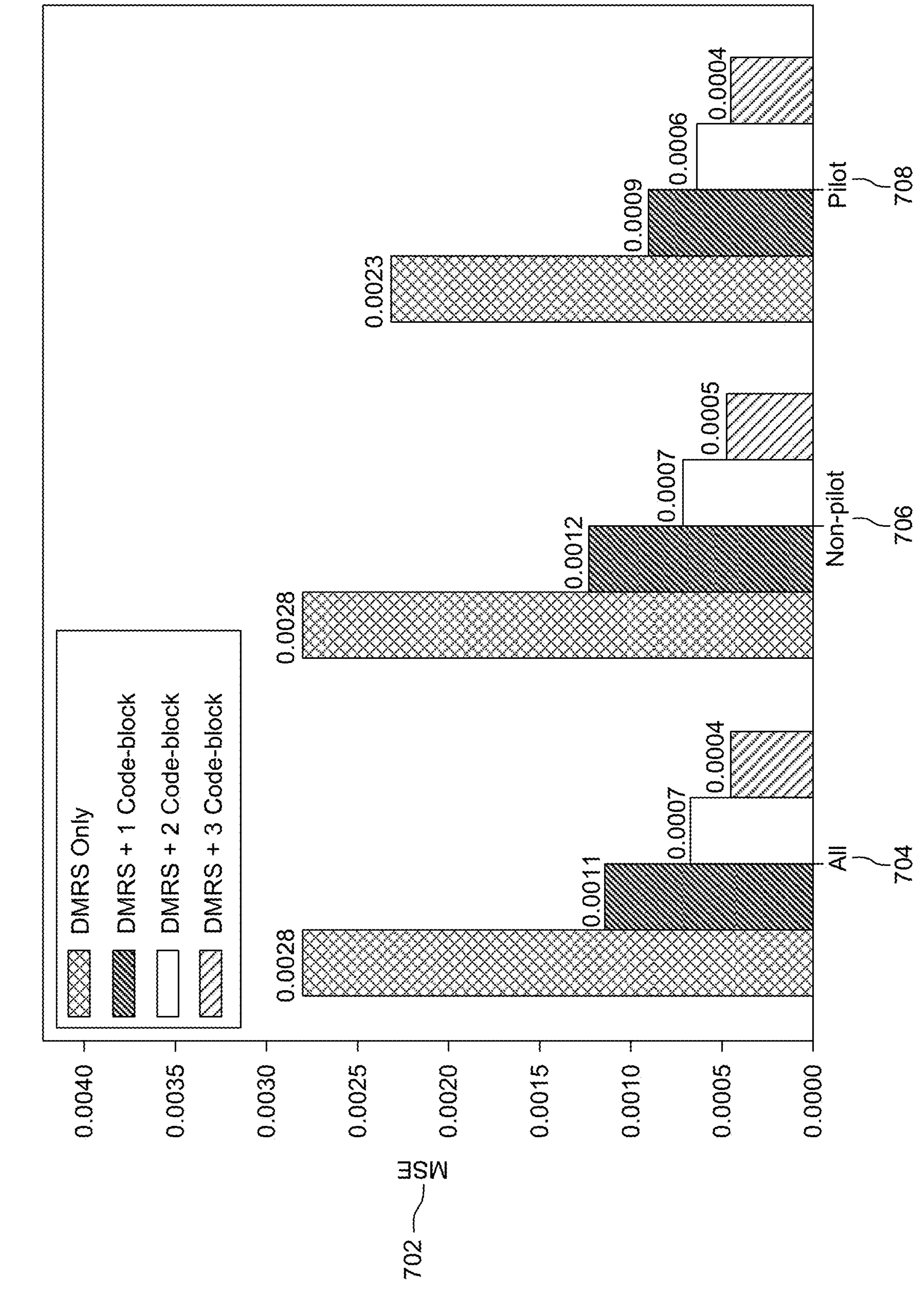
FIG. 7 is a graph illustrating an analysis the model outcomes in isolation of an exemplary AI channel estimation model.

FIG. 7 is a graph illustrating the analysis of an exemplary AI channel estimation model outcomes in isolation.

The analyzed outcomes are achieved by operating the above described ResNet model in inference mode utilizing the above described test dataset. The Mean Squared Error (MSE) between the predicted channel matrix and the ground truth is used as the performance metric. FIG. 7 depicts the results for all scenarios where 0, 1, 2, or 3 code-blocks are accurately decoded. As observed, the channel estimation model's performance is significantly enhanced when pseudo-pilots (known resource elements) are incorporated in the input. The MSE values 702 decrease from 0.0028 in the case when only DMRS is used, to 0.0004 when 3 out of the 4 decoded blocks pass CRC. Remarkably, even with a single correctly decoded block the MSE diminishes by approximately 60%.

The MSE values 702 are shown for the following sets of resource elements (REs):

All, 704, shows the overall MSE values for all resource elements in the channel matrix; Non-Pilot, 706, shows the MSE when only considering the non-pilot values of the channel matrix; and Pilot, 708, shows the MSE when only considering pilot signals (including DMRS and pseudo-pilots); and.

End-to-End Evaluation in the Exemplary Receiver Pipeline

Below the performance of the exemplary receiver pipeline illustrated in FIG. 5 in an end-to-end simulation are described. Table 2 illustrates the block error rate (BLER) under various scenarios at different Eb/No ratios. For this particular experimental trial, random binary inputs are fed into the pipeline for a duration of 400 slots for each scenario and each Eb/No ratio. The channel model was initialized with a random seed that is distinct from the random seed(s) employed to generate the training dataset. CDL-C was utilized as the channel model for the experimental trial shown in Table 2.

utilizing information already available at the receiver without requiring any additional resources, for example additional DMRS resource elements.

It is also significant that these improvements occur precisely when most needed. At lower Eb/No ratio, for example 7.25 dB and below, communication is not feasible even when perfect knowledge of the channel is available. At higher Eb/No ratios, for example 8.5 dB and above, channel coding can eliminate all retransmissions without the need for intricate algorithms. Thus, the mid-range of 7.5 to 8.25 dB is the area where improvements are most crucial, and this is precisely within the range that the ML-based channel estimation significantly enhances throughput.

Figure 9:
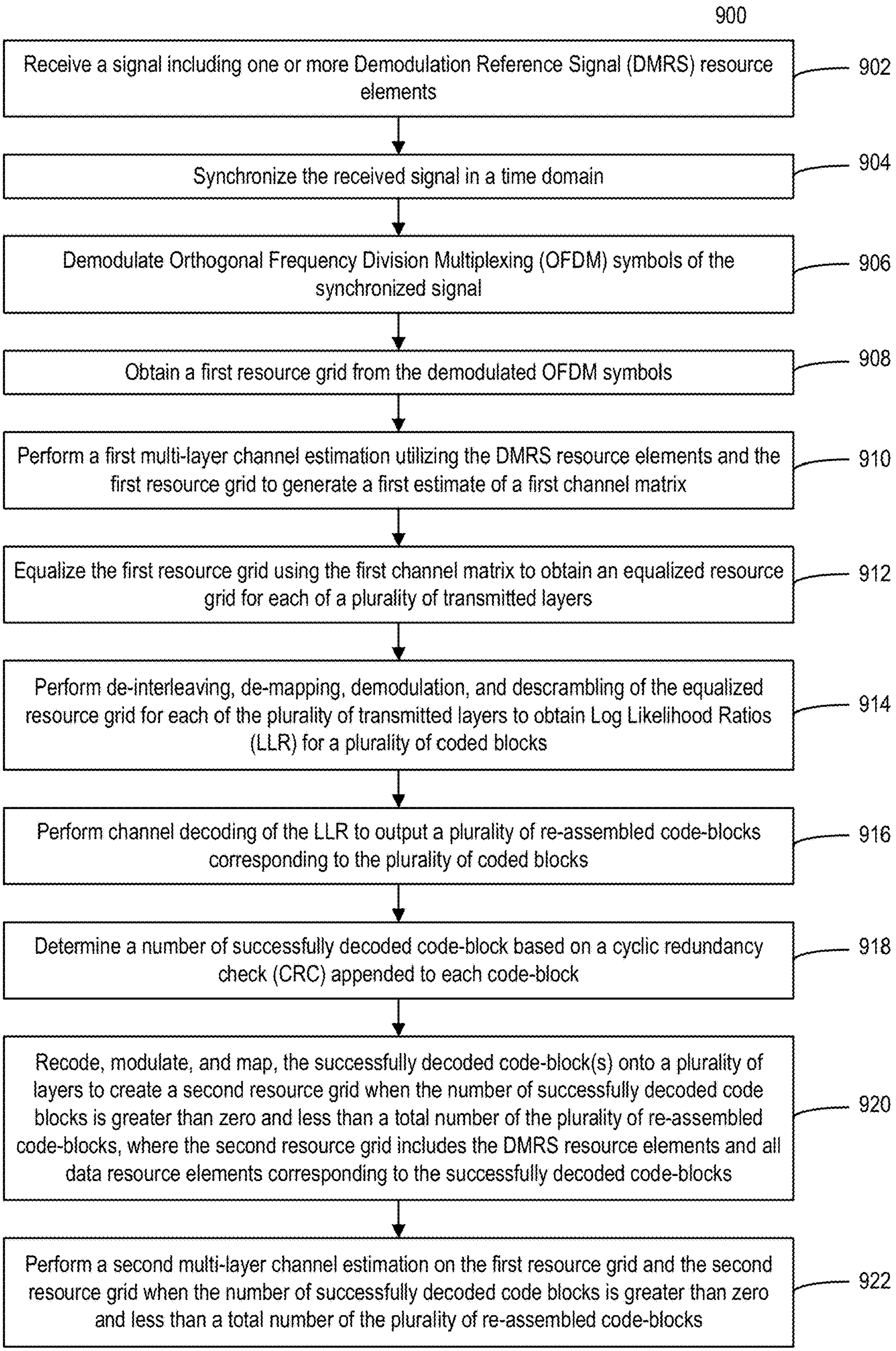
FIG. 9 is a flow diagram of an exemplary channel estimation process.

FIG. 9 is a flow diagram of an exemplary channel estimation process.

As shown in FIG. 9, process 900 may include receiving a signal including one or more Demodulation Reference Signal (DMRS) resource elements at 902. For example, A WTRU may receive a signal including one or more DMRS resource elements, as described above. Process 900 may include synchronizing the received signal in a time domain at 904, and demodulating Orthogonal Frequency Division Multiplexing (OFDM) symbols of the synchronized signal at 906. For example, the WTRU may synchronize the received signal in a time domain and demodulate OFDM symbols of the synchronized signal, as described above. Process 900 may include obtaining a first resource grid from the demodulated OFDM symbols at 908 and performing a first multi-layer channel estimation utilizing the DMRS resource elements and the first resource grid to generate a first estimate of a first channel matrix at 910. Following the example, the WTRU may obtain a first resource grid from the demodulated OFDM symbols and perform a first multi-layer channel estimation utilizing the DMRS resource elements and the first resource grid to generate a first estimate of a first channel matrix, as described above. Process 900 may include equalizing the first resource grid using the first channel matrix to obtain an equalized resource grid for each of a plurality of transmitted layers at 912 and performing de-interleaving, de-mapping, demodulation, and descrambling of the equalized resource grid for each of the plurality of transmitted layers to obtain Log Likelihood Ratios (LLR) for a plurality of coded blocks at 914. Process 900 may include performing channel decoding of the LLR to output a plurality of reassembled code-blocks corresponding to the plurality of coded blocks at 916. Likewise, the WTRU may equalize the first channel matrix to obtain an equalized resource grid for each of a plurality of transmitted layers, perform de-interleaving, de-mapping, demodulation, and descrambling of the equalized resource grid for each of the plurality of transmitted layers to obtain the LLR for a

TABLE 2

End-to-end Block Error Rates (BLER) percentage for different channel estimation scenarios and different EB/No

| Channel | Eb/No | | | | | | | | | | | | |
|---|---|---|---|---|---|---|---|---|---|---|---|---|---|
| Estimation | 7 | 7.25 | 7.5 | 7.75 | 8 | 8.25 | 8.5 | 8.75 | 9 | 9.5 | 10 | 10.5 | 11 |
| LS | 100 | 100 | 100 | 100 | 100 | 100 | 100 | 100 | 97.5 | 50.1 | 50 | 9.2 | 0 |
| ML (DMRS Only) | 100 | 100 | 100 | 95.7 | 68.2 | 23.4 | 0.4 | 0 | 0 | 0 | 0 | 0 | 0 |
| ML (DMRS + Pseudo-Pilots) | 100 | 100 | 100 | 82.8 | 2.5 | 0 | 0 | 0 | 0 | 0 | 0 | 0 | 0 |
| Perfect | 100 | 38.2 | 0 | 0 | 0 | 0 | 0 | 0 | 0 | 0 | 0 | 0 | 0 |

Figure 8:
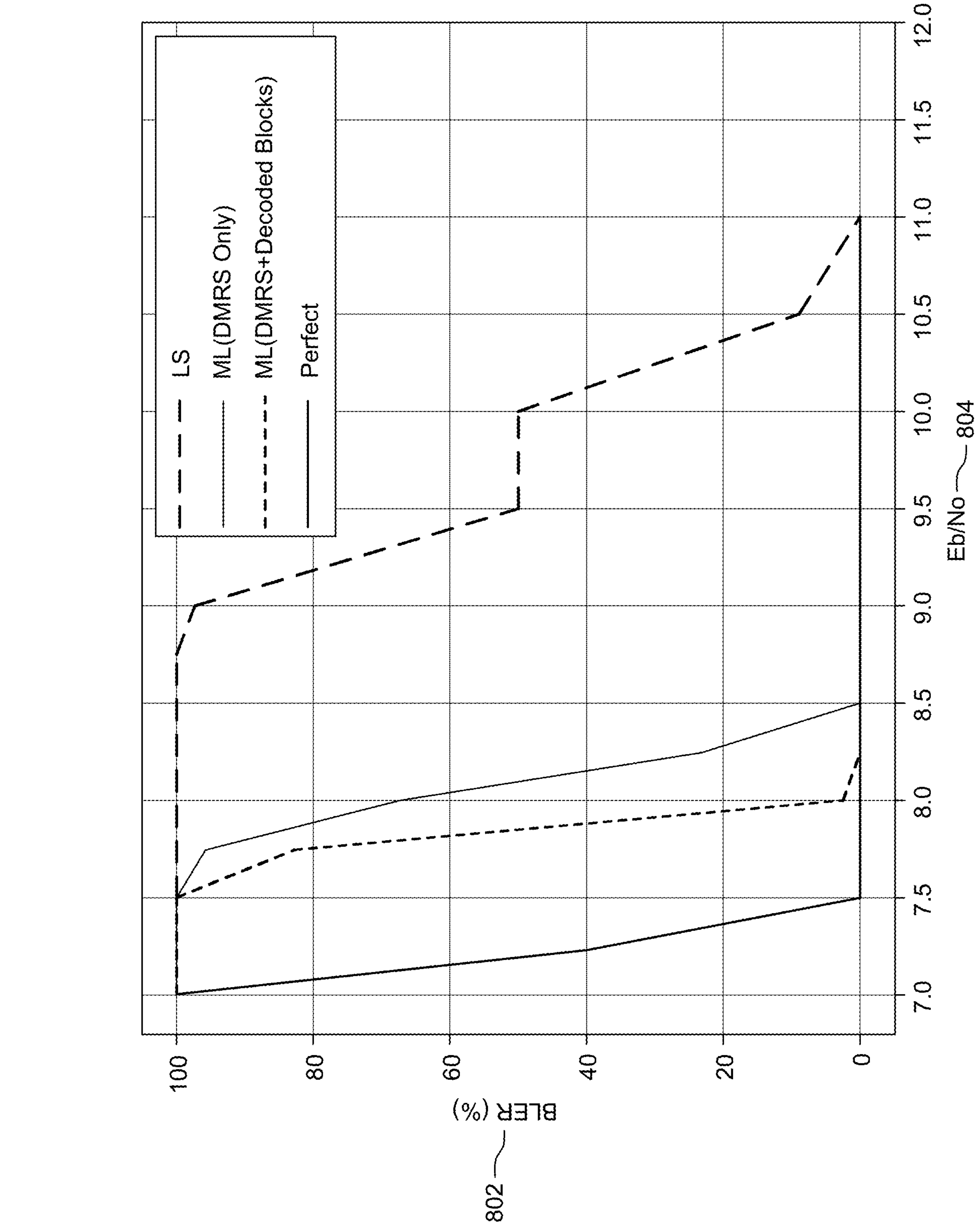
FIG. 8 is a graph illustrating the block Error Rate (BLER) for different channel estimation scenarios.

FIG. 8 is a graph illustrating the block Error Rate (BLER) for different channel estimation scenarios. This is the same data that is shown in Table 2. The CDL-C was utilized as the channel model for the experimental trial shown in Table 2 and FIG. 8; however, very similar outcomes were observed with other CDL channel profiles.

LS in Table 2 and FIG. 8 represents a Least Square algorithm that is a common algorithm implemented for channel estimation. Table 2 and FIG. 8 show the improvements of resulting from use of a ML channel estimation. As shown in FIG. 8, the performance of the receiver pipeline is substantially enhanced simply by substituting the Least Square algorithm with the deep-learning model. Even when only DMRS is used as the input, the results exhibit a notable improvement in the Eb/NO ratio of more than 3 dB for the same BLER value.

Table 2 and FIG. 8 show the improvements that result when resource elements in correctly decoded code-blocks (Pseudo-Pilots) are incorporated in the channel estimation. This improvement is notably substantial in the Eb/No ratios between 7.5 and 8.5 dB when compared with ML-based channel estimation only using DMRS. For example, at 8 dB, employing the ML-based channel estimation reduces the BLER from 68.2% to 2.5%, and at 8.25 dB, block errors are completely eradicated. This decrease in BLER results in a reduction in energy consumption and resources required for retransmissions, and the decrease in BLER also results in a decrease in communication latency. This is accomplished plurality of coded blocks, and perform channel decoding of the LLR to output a plurality of reassembled code-blocks corresponding to the plurality of coded blocks as described above.

Process 900 may include additional implementations, such as any single implementation or any combination of implementations described below and/or in connection with one or more other processes or processing circuitry described elsewhere herein. In an implementation, process 900 may further include determining a number of successfully decoded code-block based on a cyclic redundancy check (CRC) appended to each code-block at 918; recoding, modulating, and mapping, the successfully decoded code-block(s) onto a plurality of layers to create a second resource grid when the number of successfully decoded code blocks is greater than zero and less than a total number of the plurality of reassembled code-blocks, where the second resource grid includes the DMRS resource elements and all data resource elements corresponding to the successfully decoded code-blocks at 920, and performing a second multi-layer channel estimation on the first resource grid and the second resource grid when the number of successfully decoded code blocks is greater than zero and less than a total number of the plurality of reassembled code-blocks at 922.

In an implementation, the process may also include transmitting a Hybrid Automatic Repeat Request (HARQ) corresponding to each of the plurality of reassembled code-blocks when the number of successfully decoded code-blocks equals zero. That is, if the reassembled code-blocks do not contain any "good" data, a HARQ process for retransmission of the data is required.

In another implementation, alone or in combination with any of the above implementations, the process may be performed until the number of successfully decoded code blocks is equal to the total number of the plurality of reassembled code-blocks or is equal to a previous number of successfully decoded code blocks. In yet another implementation, alone or in combination with any of the above implementations, the process of recoding, modulating, and mapping is performed with the same coding, modulating, and mapping used to transmit the received signal.

In yet another implementation, alone or in combination with one or more of the above implementations, the second resource grid retains all the data resource elements corresponding to the successfully decoded code block or code blocks and the DMRS resource elements, and where data resources elements corresponding to unsuccessfully decoded code-block(s) are set to zero in the second resource grid.

In a further implementation, alone or in combination with one or more of the above implementations, the WTRU may include at least two receive antenna elements, and obtaining the first resource grid includes mapping data resource elements to corresponding time symbols and corresponding sub-carriers for each antenna element of the WTRU. In one or more of the above implementations, alone or in combination, the first channel matrix is a four dimensional (4D) channel matrix with the dimensions: number of time-symbols (L), number of Orthogonal Frequency-Division Multiplexing (OFDM) sub-carriers (K), a number of transmission layers (P) and number of the receive antenna elements (R).

In another implementation, alone or in combination with one or more of the above implementations, the equalized resource grid may include data resource elements mapped to the corresponding time symbols per slot and the corresponding number of sub-carriers for each of a number of transmitted layers. Another implementation, alone or in combination with one or more of the above implementations, the channel decoding may include rate-recovery, at least one of Low-Densify Parity-Check (LDPC) decoding or Polar decoding, and reassembling the code-blocks to provide a final decoded transport block.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel, and the process may be performed in one or more processors or processing circuitry in a receiver or a transceiver.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit/receive unit (WTRU), the method comprising:

receiving a signal including one or more Demodulation Reference Signal (DMRS) resource elements;

synchronizing the received signal in a time domain;

demodulating Orthogonal Frequency Division Multiplexing (OFDM) symbols of the synchronized signal;

obtaining a first resource grid from the demodulated OFDM symbols;

performing a first multi-layer channel estimation utilizing the received DMRS resource elements and the first resource grid to generate a first estimate of a first channel matrix;

equalizing the first resource grid using the first channel matrix to obtain an equalized resource grid for each of a plurality of transmitted layers;

performing de-interleaving, de-mapping, demodulation, and descrambling of the equalized resource grid for each of the plurality of transmitted layers to obtain Log Likelihood Ratios (LLR) for a plurality of coded blocks; and performing channel decoding of the LLR to output a plurality of reassembled code-blocks corresponding to the plurality of coded blocks.

2. The method according to claim 1, further comprising:

determining a number of successfully decoded code-block based on a cyclic redundancy check (CRC) appended to each code-block;

transmitting a Hybrid Automatic Repeat Request (HARQ) corresponding to each of the plurality of reassembled code-blocks when the number of successfully decoded code-blocks equals zero;

recoding, modulating, and mapping, the successfully decoded code-block(s) onto a plurality of layers to create a second resource grid when the number of successfully decoded code blocks is greater than zero and less than a total number of the plurality of reassembled code-blocks, wherein the second resource grid includes the DMRS resource elements and all data resource elements corresponding to the successfully decoded code-blocks; and performing a second multi-layer channel estimation on the first resource grid and the second resource grid when the number of successfully decoded code blocks is greater than zero and less than a total number of the plurality of reassembled code-blocks.

3. The method according to claim 2, wherein the method is performed until the number of successfully decoded code blocks is equal to the total number of the plurality of reassembled code-blocks or is equal to a previous number of successfully decoded code blocks.

4. The method according to claim 1, wherein the WTRU comprises at least two receive antenna elements, and wherein obtaining the first resource grid includes mapping data resource elements to corresponding time symbols and corresponding sub-carriers for each antenna element of the WTRU.

5. The method according to claim 4, wherein the first channel matrix is a four dimensional (4D) channel matrix with the dimensions: number of time-symbols (L), number of Orthogonal Frequency-Division Multiplexing (OFDM) sub-carriers (K), a number of transmission layers (P) and number of the receive antenna elements (R).

6. The method according to claim 1, wherein the equalized resource grid comprises data resource elements mapped to the corresponding time symbols per slot and the corresponding number of sub-carriers for each of a number of transmitted layers.

7. The method according to claim 1, wherein the channel decoding includes rate-recovery, at least one of Low-Densify Parity-Check (LDPC) decoding or Polar decoding, and reassembling the code-blocks to provide a final decoded transport block.

8. The method according to claim 2, wherein the recoding, modulating, and mapping is performed with the same coding, modulating, and mapping used to transmit the received signal.

9. The method according to claim 2, wherein the second resource grid retains all the data resource elements corresponding to the successfully decoded code block(s) and the DMRS resource elements, and wherein data resources elements corresponding to unsuccessfully decoded code-block (s) are set to zero in the second resource grid.

10. The method according to claim 1, wherein performing the multi-layer channel estimation is via a trained Artificial Intelligence (AI) deep-learning model.

11. A Wireless Transmit/Receive Unit (WTRU) comprising:

a transceiver configured to receive a signal including one or more Demodulation Reference Signal (DMRS) resources elements;

signal processing circuitry configured to synchronize the received signal in a time domain and demodulate Orthogonal Frequency Division Multiplexing (OFDM) symbols of the signal to obtain a first resource grid;

a multi-layer channel estimator configured to perform channel estimation utilizing the DMRS resource elements and the first resource grid to generate a first estimate of a first channel matrix;

the signal processing circuitry configured to:

equalize the first resource grid using the first channel matrix to obtain an equalized resource grid;

de-interleave, de-map, demodulate, and descramble the equalized resource grid to obtain Log Likelihood Ratios (LLR) for a plurality of coded blocks; and decode the LLR to output a plurality of reassembled code-blocks corresponding to the plurality of coded blocks.

12. The WTRU according to claim 11, wherein the signal processing circuitry is further configured to determine a number of successfully decoded code-blocks out of the plurality of reassembled code-blocks based on a cyclic redundancy check (CRC) appended to each code-block;

the transceiver is further configured to transmit a Hybrid Automatic Repeat Request (HARQ) corresponding to each of the plurality of reassembled code-blocks when the number of successfully decoded code-blocks equals zero;

the signal processing circuitry is further configured to: recode, modulate, and map, the successfully decoded code-block(s) onto a plurality of layers to create a second resource grid when the number of successfully decoded code blocks is greater than zero and less than a total number of the plurality of reassembled code-blocks, wherein the second resource grid includes the DMRS resource elements and all data resource elements corresponding to the successfully decoded code-blocks; and the multi-layer channel estimator is further configured to perform multi-layer channel estimation on the first resource grid and the second resource grid when the number of successfully decoded code blocks is greater than zero and less than a total number of the plurality of reassembled code-blocks or when the number of successfully decoded code blocks is less than a previous number of successfully decoded code blocks.

13. The WTRU according to claim 12, wherein the WTRU comprises at least two receive antenna elements, and wherein the signal processing circuitry is configured to obtain the first resource grid by mapping the data resource elements to corresponding time symbols and corresponding sub-carriers for each antenna element of the WTRU.

14. The WTRU according to claim 13, wherein the first channel matrix is a four dimensional (4D) channel matrix with the dimensions: number of time-symbols (L), number of Orthogonal Frequency-Division Multiplexing (OFDM) symbols (K), number of transmission layers (P), and number of the receive antenna elements (R).

15. The WTRU according to claim 11, wherein the equalized resource grid comprises data resource elements mapped to the corresponding time symbols per slot and the corresponding number of sub-carriers for each of a number of transmitted layers.

16. The WTRU according to claim 11, wherein the signal processing circuitry is configured to decode the received signal by performing at least one of Low-Densify Parity-Check (LDPC) decoding or Polar decoding, and reassembling the code-blocks to provide a final decoded transport block.

17. The WTRU according to claim 12, wherein the signal processing circuitry is configured to recode, modulate and map the successfully decoded code-block(s) s onto a plurality of layers to create a second resource grid with the same coding, modulating, and mapping used to transmit the signal.

18. The WTRU according to claim 12, wherein the second resource grid retains all the data resource elements corresponding to the successfully decoded code block(s) and the DMRS resource elements, and wherein data resource elements corresponding to unsuccessfully decoded code-block(s) are set to zero in the second resource grid.

19. The WTRU according to claim 11, wherein the multi-layer channel estimator is a trained Artificial Intelligence (AI) deep-learning model.

* * * * *